(12) United States Patent
Vihriala et al.

(10) Patent No.: US 8,319,362 B2
(45) Date of Patent: Nov. 27, 2012

(54) WIND POWER TURBINE WITH A COOLING SYSTEM

(75) Inventors: Harri Vihriala, Luxembourg (LU); Thomas Kassner, Luxembourg (LU)

(73) Assignee: Wilic S.AR.L., Luxembourg (LU)

( * ) Notice: Subject to any disclaimer, the term of this patent is extended or adjusted under 35 U.S.C. 154(b) by 389 days.

(21) Appl. No.: 12/616,432

(22) Filed: Nov. 11, 2009

(65) Prior Publication Data
US 2010/0117362 A1 May 13, 2010

(30) Foreign Application Priority Data
Nov. 12, 2008 (IT) .................................. MI08A2006

(51) Int. Cl.
*F03D 9/00* (2006.01)
*H02P 9/04* (2006.01)

(52) U.S. Cl. ........................................... 290/44; 290/55
(58) Field of Classification Search .................... 290/44, 290/55; 416/1, 132 B; 415/2.1
See application file for complete search history.

(56) References Cited

U.S. PATENT DOCUMENTS

| | | | |
|---|---|---|---|
| 1,894,357 A | 1/1933 | Manikowske et al. |
| 1,948,854 A | 2/1934 | Heath |
| 1,979,813 A | 11/1934 | Reis |
| 2,006,172 A | 6/1935 | Klappauf |
| 2,040,218 A | 5/1936 | Soderberg |
| 2,177,801 A | 10/1939 | Erren |
| 2,469,734 A | 5/1949 | Ledwith |
| 2,496,897 A | 2/1950 | Strickland |
| 2,655,611 A | 10/1953 | Sherman |
| 2,739,253 A | 3/1956 | Plumb |
| 2,806,160 A | 9/1957 | Brainard |
| 2,842,214 A | 7/1958 | Prewitt |
| 2,903,610 A | 9/1959 | Bessiere |
| 3,004,782 A | 10/1961 | Meermans |
| 3,072,813 A | 1/1963 | Reijnst et al. |
| 3,083,311 A | 3/1963 | Krasnow |
| 3,131,942 A | 5/1964 | Ertaud |
| 3,168,686 A | 2/1965 | King et al. |
| 3,221,195 A | 11/1965 | Hoffmann |
| 3,363,910 A | 1/1968 | Toronchuk |
| 3,364,523 A | 1/1968 | Schippers |
| 3,392,910 A | 7/1968 | Tanzberger |
| 3,468,548 A | 9/1969 | Webb |
| 3,700,247 A | 10/1972 | Butler et al. |

(Continued)

FOREIGN PATENT DOCUMENTS

CA 2404939 4/2004

(Continued)

OTHER PUBLICATIONS

Maxime R. Dubous, Henk Polinder, Study of TFPM Machines with Toothed Rotor Applied to Direct-Drive Generators for Wind Turbines, 2004.

(Continued)

*Primary Examiner* — Hae Moon Hyeon
(74) *Attorney, Agent, or Firm* — Neal, Gerber & Eisenberg LLP

(57) ABSTRACT

A wind power turbine having a pylon; a nacelle; an electric generator fitted to the nacelle to produce electric energy; a frequency converter housed inside the pylon; and a cooling system for cooling the frequency converter, and which has an open-loop circuit provided with a conduit, and at least one cooling fin thermally connected to the frequency converter and housed in the conduit.

13 Claims, 3 Drawing Sheets

U.S. PATENT DOCUMENTS

| | | |
|---|---|---|
| 3,724,861 A | 4/1973 | Lesiecki |
| 3,746,349 A | 7/1973 | Smale et al. |
| 3,748,089 A | 7/1973 | Boyer et al. |
| 3,789,252 A | 1/1974 | Abegg |
| 3,841,643 A | 10/1974 | McLean |
| 3,860,843 A | 1/1975 | Kawasaki et al. |
| 3,942,026 A | 3/1976 | Carter |
| 3,963,247 A | 6/1976 | Nommensen |
| 3,968,969 A | 7/1976 | Mayer et al. |
| 4,022,479 A | 5/1977 | Orlowski |
| 4,061,926 A | 12/1977 | Peed |
| 4,087,698 A | 5/1978 | Myers |
| 4,273,343 A | 6/1981 | Visser |
| 4,289,970 A | 9/1981 | Deibert |
| 4,291,235 A | 9/1981 | Bergey, Jr. et al. |
| 4,292,532 A | 9/1981 | Leroux |
| 4,336,649 A | 6/1982 | Glaser |
| 4,339,874 A | 7/1982 | Mc'Carty et al. |
| 4,348,604 A | 9/1982 | Thode |
| 4,350,897 A | 9/1982 | Benoit |
| 4,354,126 A | 10/1982 | Yates |
| 4,368,895 A | 1/1983 | Okamoto et al. |
| 4,398,773 A | 8/1983 | Boden et al. |
| 4,452,046 A | 6/1984 | Valentin |
| 4,482,831 A | 11/1984 | Notaras et al. |
| 4,490,093 A | 12/1984 | Chertok et al. |
| 4,517,483 A | 5/1985 | Hucker et al. |
| 4,517,484 A | 5/1985 | Dacier |
| 4,521,026 A | 6/1985 | Eide |
| 4,585,950 A | 4/1986 | Lund |
| 4,613,779 A | 9/1986 | Meyer |
| 4,638,200 A | 1/1987 | Le Corre et al. |
| 4,648,801 A | 3/1987 | Wilson |
| 4,694,654 A | 9/1987 | Kawamura |
| 4,700,096 A | 10/1987 | Epars |
| 4,714,852 A | 12/1987 | Kawada et al. |
| 4,720,640 A | 1/1988 | Anderson et al. |
| 4,722,661 A | 2/1988 | Mizuno |
| 4,724,348 A | 2/1988 | Stokes |
| 4,761,590 A | 8/1988 | Kaszman |
| 4,792,712 A | 12/1988 | Stokes |
| 4,801,244 A | 1/1989 | Stahl |
| 4,866,321 A | 9/1989 | Blanchard et al. |
| 4,900,965 A | 2/1990 | Fisher |
| 4,906,060 A | 3/1990 | Claude |
| 4,973,868 A | 11/1990 | Wust |
| 4,976,587 A | 12/1990 | Johnston et al. |
| 5,004,944 A | 4/1991 | Fisher |
| 5,063,318 A | 11/1991 | Anderson |
| 5,090,711 A | 2/1992 | Becker |
| 5,091,668 A | 2/1992 | Cuenot et al. |
| 5,177,388 A | 1/1993 | Hotta et al. |
| 5,191,255 A | 3/1993 | Kloosterhouse et al. |
| 5,275,139 A | 1/1994 | Rosenquist |
| 5,280,209 A | 1/1994 | Leupold et al. |
| 5,281,094 A | 1/1994 | McCarty et al. |
| 5,298,827 A | 3/1994 | Sugiyama |
| 5,302,876 A | 4/1994 | Iwamatsu et al. |
| 5,311,092 A | 5/1994 | Fisher |
| 5,315,159 A | 5/1994 | Gribnau |
| 5,331,238 A | 7/1994 | Johnsen |
| 5,410,997 A | 5/1995 | Rosenquist |
| 5,419,683 A | 5/1995 | Peace |
| 5,456,579 A | 10/1995 | Olson |
| 5,483,116 A | 1/1996 | Kusase et al. |
| 5,506,453 A | 4/1996 | McCombs |
| 5,579,800 A | 12/1996 | Walker |
| 5,609,184 A | 3/1997 | Apel et al. |
| 5,663,600 A | 9/1997 | Baek et al. |
| 5,670,838 A | 9/1997 | Everton |
| 5,696,419 A | 12/1997 | Rakestraw et al. |
| 5,704,567 A | 1/1998 | Maglieri |
| 5,746,576 A | 5/1998 | Bayly |
| 5,777,952 A | 7/1998 | Nishimura et al. |
| 5,783,894 A | 7/1998 | Wither |
| 5,793,144 A | 8/1998 | Kusase et al. |
| 5,798,632 A | 8/1998 | Muljadi |
| 5,801,470 A | 9/1998 | Johnson et al. |
| 5,811,908 A | 9/1998 | Iwata et al. |
| 5,814,914 A | 9/1998 | Caamaño |
| 5,844,333 A | 12/1998 | Sheerin |
| 5,844,341 A | 12/1998 | Spooner et al. |
| 5,857,762 A | 1/1999 | Schwaller |
| 5,886,441 A | 3/1999 | Uchida et al. |
| 5,889,346 A | 3/1999 | Uchida et al. |
| 5,894,183 A | 4/1999 | Borchert |
| 5,925,964 A | 7/1999 | Kusase et al. |
| 5,952,755 A | 9/1999 | Lubas |
| 5,961,124 A | 10/1999 | Muller |
| 5,973,435 A | 10/1999 | Irie et al. |
| 5,986,374 A | 11/1999 | Kawakami |
| 5,986,378 A | 11/1999 | Caamaño |
| 6,013,968 A | 1/2000 | Lechner et al. |
| 6,037,692 A | 3/2000 | Miekka et al. |
| 6,064,123 A | 5/2000 | Gislason |
| 6,067,227 A | 5/2000 | Katsui et al. |
| 6,089,536 A | 7/2000 | Watanabe et al. |
| 6,093,984 A | 7/2000 | Shiga et al. |
| 6,127,739 A | 10/2000 | Appa |
| 6,172,429 B1 | 1/2001 | Russell |
| 6,177,746 B1 | 1/2001 | Tupper et al. |
| 6,193,211 B1 | 2/2001 | Watanabe et al. |
| 6,194,799 B1 | 2/2001 | Miekka et al. |
| 6,215,199 B1 | 4/2001 | Lysenko et al. |
| 6,232,673 B1 | 5/2001 | Schoo et al. |
| 6,278,197 B1 | 8/2001 | Appa |
| 6,285,090 B1 | 9/2001 | Brutsaert et al. |
| 6,326,711 B1 | 12/2001 | Yamaguchi et al. |
| 6,365,994 B1 | 4/2002 | Watanabe et al. |
| 6,373,160 B1 | 4/2002 | Schrödl |
| 6,376,956 B1 | 4/2002 | Hosoya |
| 6,378,839 B2 | 4/2002 | Watanabe et al. |
| 6,384,504 B1 | 5/2002 | Ehrhart et al. |
| 6,417,578 B1 | 7/2002 | Chapman et al. |
| 6,428,011 B1 | 8/2002 | Oskouei |
| 6,452,287 B1 | 9/2002 | Looker |
| 6,452,301 B1 | 9/2002 | Van Dine et al. |
| 6,455,976 B1 | 9/2002 | Nakano |
| 6,472,784 B2 | 10/2002 | Miekka et al. |
| 6,474,653 B1 | 11/2002 | Hintenlang et al. |
| 6,476,513 B1 | 11/2002 | Gueorguiev |
| 6,483,199 B2 | 11/2002 | Umemoto et al. |
| 6,492,743 B1 | 12/2002 | Appa |
| 6,492,754 B1 | 12/2002 | Weiglhofer et al. |
| 6,499,532 B1 | 12/2002 | Williams |
| 6,504,260 B1 | 1/2003 | Debleser |
| 6,515,390 B1 | 2/2003 | Lopatinsky et al. |
| 6,520,737 B1 | 2/2003 | Fischer et al. |
| 6,548,932 B1 | 4/2003 | Weiglhofer et al. |
| 6,590,312 B1 | 7/2003 | Seguchi et al. |
| 6,603,232 B2 | 8/2003 | Van Dine et al. |
| 6,617,747 B1 | 9/2003 | Petersen |
| 6,629,358 B2 | 10/2003 | Setiabudi et al. |
| 6,664,692 B1 | 12/2003 | Kristoffersen |
| 6,676,122 B1 * | 1/2004 | Wobben .................. 290/55 |
| 6,683,397 B2 | 1/2004 | Gauthier et al. |
| 6,700,260 B2 | 3/2004 | Hsu et al. |
| 6,700,288 B2 | 3/2004 | Smith |
| 6,707,224 B1 | 3/2004 | Petersen |
| 6,720,688 B1 | 4/2004 | Schiller |
| 6,727,624 B2 | 4/2004 | Morita et al. |
| 6,746,217 B2 | 6/2004 | Kim et al. |
| 6,759,758 B2 | 7/2004 | Martinez |
| 6,762,525 B1 | 7/2004 | Maslov et al. |
| 6,774,504 B1 * | 8/2004 | Lagerwey .................. 290/44 |
| 6,781,276 B1 | 8/2004 | Stiesdal et al. |
| 6,784,564 B1 | 8/2004 | Wobben |
| 6,794,781 B2 | 9/2004 | Razzell et al. |
| 6,828,710 B1 | 12/2004 | Gabrys |
| 6,856,042 B1 | 2/2005 | Kubota |
| 6,879,075 B2 | 4/2005 | Calfo et al. |
| 6,888,262 B2 | 5/2005 | Blakemore |
| 6,891,299 B2 | 5/2005 | Coupart et al. |
| 6,903,466 B1 | 6/2005 | Mercier et al. |
| 6,903,475 B2 | 6/2005 | Ortt et al. |
| 6,906,444 B2 | 6/2005 | Hattori et al. |
| 6,911,741 B2 | 6/2005 | Petteersen et al. |

| | | |
|---|---|---|
| 6,921,243 B2 | 7/2005 | Canini et al. |
| 6,931,834 B2 | 8/2005 | Jones |
| 6,933,645 B1 | 8/2005 | Watson |
| 6,933,646 B2 | 8/2005 | Kinoshita |
| 6,942,454 B2 | 9/2005 | Ohlmann |
| 6,945,747 B1 | 9/2005 | Miller |
| 6,949,860 B2 | 9/2005 | Hama et al. |
| 6,951,443 B1 | 10/2005 | Blakemore |
| 6,972,498 B2 | 12/2005 | Jamieson et al. |
| 6,983,529 B2 | 1/2006 | Ortt et al. |
| 6,984,908 B2 | 1/2006 | Rinholm et al. |
| 6,987,342 B2 | 1/2006 | Hans |
| 6,998,729 B1 | 2/2006 | Wobben |
| 7,004,724 B2 | 2/2006 | Pierce et al. |
| 7,008,172 B2 | 3/2006 | Selsam |
| 7,008,348 B2 | 3/2006 | LaBath |
| 7,016,006 B2 | 3/2006 | Song |
| 7,021,905 B2 | 4/2006 | Torrey et al. |
| 7,028,386 B2 | 4/2006 | Kato et al. |
| 7,033,139 B2 | 4/2006 | Wobben |
| 7,038,343 B2 | 5/2006 | Agnes et al. |
| 7,042,109 B2 | 5/2006 | Gabrys |
| 7,057,305 B2 * | 6/2006 | Kruger-Gotzmann et al. . 290/55 |
| 7,075,192 B2 | 7/2006 | Bywaters et al. |
| 7,081,696 B2 | 7/2006 | Ritchey |
| 7,088,024 B2 | 8/2006 | Agnes et al. |
| 7,091,642 B2 | 8/2006 | Agnes et al. |
| 7,095,128 B2 | 8/2006 | Canini et al. |
| 7,098,552 B2 | 8/2006 | McCoin |
| 7,109,600 B1 | 9/2006 | Bywaters et al. |
| 7,111,668 B2 | 9/2006 | Rürup |
| 7,116,006 B2 | 10/2006 | McCoin |
| 7,119,469 B2 | 10/2006 | Ortt et al. |
| 7,154,191 B2 | 12/2006 | Jansen et al. |
| 7,161,259 B2 * | 1/2007 | Lagerwey ........................ 290/44 |
| 7,161,260 B2 | 1/2007 | Krügen-Gotzmann et al. |
| 7,166,942 B2 | 1/2007 | Yokota |
| 7,168,248 B2 | 1/2007 | Sakamoto et al. |
| 7,168,251 B1 | 1/2007 | Janssen |
| 7,179,056 B2 | 2/2007 | Siegfriedsen |
| 7,180,204 B2 | 2/2007 | Grant et al. |
| 7,183,665 B2 | 2/2007 | Bywaters et al. |
| 7,196,446 B2 | 3/2007 | Hans |
| 7,205,678 B2 | 4/2007 | Casazza et al. |
| 7,217,091 B2 | 5/2007 | LeMieux |
| 7,259,472 B2 | 8/2007 | Miyake et al. |
| 7,281,501 B2 | 10/2007 | Leufen et al. |
| 7,285,890 B2 | 10/2007 | Jones et al. |
| 7,323,792 B2 | 1/2008 | Sohn |
| 7,345,376 B2 | 3/2008 | Costin |
| 7,358,637 B2 | 4/2008 | Tapper |
| 7,377,163 B2 | 5/2008 | Miyagawa |
| 7,385,305 B2 | 6/2008 | Casazza et al. |
| 7,385,306 B2 | 6/2008 | Casazza et al. |
| 7,392,988 B2 | 7/2008 | Moldt et al. |
| 7,427,814 B2 | 9/2008 | Bagepalli et al. |
| 7,431,567 B1 | 10/2008 | Bevington et al. |
| 7,443,066 B2 | 10/2008 | Salamah et al. |
| 7,458,261 B2 | 12/2008 | Miyagawa |
| 7,482,720 B2 | 1/2009 | Gordon et al. |
| 7,548,008 B2 | 6/2009 | Jansen et al. |
| 7,550,863 B2 | 6/2009 | Versteegh |
| 7,687,932 B2 | 3/2010 | Casazza et al. |
| 8,047,774 B2 * | 11/2011 | Bagepalli ..................... 415/176 |
| 8,058,742 B2 * | 11/2011 | Erdman et al. ................. 290/55 |
| 2002/0047418 A1 | 4/2002 | Seguchi et al. |
| 2002/0047425 A1 | 4/2002 | Coupart et al. |
| 2002/0056822 A1 | 5/2002 | Watanabe et al. |
| 2002/0063485 A1 | 5/2002 | Lee et al. |
| 2002/0089251 A1 | 7/2002 | Tajima et al. |
| 2002/0148453 A1 | 10/2002 | Watanabe et al. |
| 2003/0011266 A1 | 1/2003 | Morita et al. |
| 2003/0102677 A1 | 6/2003 | Becker et al. |
| 2003/0137149 A1 | 7/2003 | Northrup et al. |
| 2003/0230899 A1 | 12/2003 | Martinez |
| 2004/0086373 A1 | 5/2004 | Page, Jr. |
| 2004/0094965 A1 | 5/2004 | Kirkegaard et al. |
| 2004/0119292 A1 | 6/2004 | Datta et al. |
| 2004/0150283 A1 | 8/2004 | Calfo et al. |

| | | |
|---|---|---|
| 2004/0151575 A1 | 8/2004 | Pierce et al. |
| 2004/0151577 A1 | 8/2004 | Pierce et al. |
| 2004/0189136 A1 | 9/2004 | Kolomeitsev et al. |
| 2005/0002783 A1 | 1/2005 | Hiel et al. |
| 2005/0002787 A1 | 1/2005 | Wobben |
| 2005/0082839 A1 | 4/2005 | McCoin |
| 2005/0230979 A1 | 10/2005 | Bywaters et al. |
| 2005/0280264 A1 | 12/2005 | Nagy |
| 2006/0000269 A1 | 1/2006 | LeMieux et al. |
| 2006/0001269 A1 | 1/2006 | Jansen et al. |
| 2006/0006658 A1 | 1/2006 | McCoin |
| 2006/0012182 A1 | 1/2006 | McCoin |
| 2006/0028025 A1 | 2/2006 | Kikuchi et al. |
| 2006/0066110 A1 | 3/2006 | Jansen et al. |
| 2006/0071575 A1 | 4/2006 | Jansen et al. |
| 2006/0091735 A1 | 5/2006 | Song et al. |
| 2006/0125243 A1 | 6/2006 | Miller |
| 2006/0131985 A1 | 6/2006 | Qu et al. |
| 2006/0152012 A1 | 7/2006 | Wiegel et al. |
| 2006/0152015 A1 | 7/2006 | Bywaters et al. |
| 2006/0152016 A1 | 7/2006 | Bywaters et al. |
| 2007/0020109 A1 | 1/2007 | Takahashi et al. |
| 2007/0116567 A1 | 5/2007 | Luetze |
| 2007/0187954 A1 | 8/2007 | Struve et al. |
| 2007/0187956 A1 | 8/2007 | Wobben |
| 2007/0222223 A1 | 9/2007 | Bagepalli et al. |
| 2007/0222226 A1 | 9/2007 | Casazza et al. |
| 2007/0222227 A1 | 9/2007 | Casazza et al. |
| 2008/0003105 A1 | 1/2008 | Nies |
| 2008/0025847 A1 | 1/2008 | Teipen |
| 2008/0050234 A1 | 2/2008 | Ingersoll et al. |
| 2008/0107526 A1 | 5/2008 | Wobben |
| 2008/0118342 A1 | 5/2008 | Seidel et al. |
| 2008/0197636 A1 | 8/2008 | Tilscher et al. |
| 2008/0197638 A1 | 8/2008 | Wobben |
| 2008/0246224 A1 | 10/2008 | Pabst et al. |
| 2008/0290662 A1 * | 11/2008 | Matesanz Gil et al. ......... 290/44 |
| 2008/0290664 A1 | 11/2008 | Kruger |
| 2008/0303281 A1 | 12/2008 | Krueger |
| 2008/0309189 A1 | 12/2008 | Pabst et al. |
| 2008/0315594 A1 | 12/2008 | Casazza et al. |
| 2009/0045628 A1 | 2/2009 | Erdman et al. |
| 2009/0060748 A1 | 3/2009 | Landa et al. |
| 2009/0094981 A1 | 4/2009 | Eggleston |
| 2009/0096309 A1 | 4/2009 | Pabst et al. |
| 2009/0302702 A1 | 12/2009 | Pabst et al. |
| 2010/0019502 A1 | 1/2010 | Pabst et al. |
| 2010/0026010 A1 | 2/2010 | Pabst |
| 2010/0123318 A1 | 5/2010 | Casazza et al. |
| 2011/0221204 A1 * | 9/2011 | Kim et al. .................... 290/55 |
| 2011/0272949 A1 * | 11/2011 | Matsuo et al. ................. 290/55 |
| 2011/0304149 A1 * | 12/2011 | Pasteuning et al. ............ 290/55 |
| 2012/0001438 A1 * | 1/2012 | Matsuo et al. ................. 290/55 |

FOREIGN PATENT DOCUMENTS

| | | |
|---|---|---|
| CA | 2518742 | 9/2004 |
| CN | 1554867 | 12/2004 |
| DE | 1130913 | 6/1962 |
| DE | 2164135 | 7/1973 |
| DE | 2322458 | 11/1974 |
| DE | 2506160 | 8/1976 |
| DE | 2922885 | 12/1980 |
| DE | 3638129 | 5/1988 |
| DE | 3718954 | 12/1988 |
| DE | 3844505 | 7/1990 |
| DE | 3903399 | 8/1990 |
| DE | 4304577 | 8/1994 |
| DE | 4402184 | 8/1995 |
| DE | 4415570 | 11/1995 |
| DE | 4444757 | 6/1996 |
| DE | 29706980 | 7/1997 |
| DE | 19636591 | 3/1998 |
| DE | 19644355 | 4/1998 |
| DE | 19652673 | 6/1998 |
| DE | 19711869 | 9/1998 |
| DE | 19774716 | 11/1998 |
| DE | 29819391 | 2/1999 |
| DE | 19801803 | 4/1999 |
| DE | 19932394 | 1/2001 |

| | | | | | | |
|---|---|---|---|---|---|---|
| DE | 19947915 | 4/2001 | | JP | 6269141 | 9/1994 |
| DE | 19951594 | 5/2001 | | JP | 10-070858 | 3/1998 |
| DE | 10000370 | 7/2001 | | JP | 11236977 | 8/1999 |
| DE | 20102029 | 8/2001 | | JP | 11-299197 | 10/1999 |
| DE | 10219190 | 11/2003 | | JP | 2000-134885 | 5/2000 |
| DE | 10246690 | 4/2004 | | JP | 2001-057750 | 2/2001 |
| DE | 102004018524 | 11/2005 | | JP | 2003453072 | 7/2003 |
| DE | 102004028746 | 12/2005 | | JP | 2004-153913 | 5/2004 |
| EP | 0013157 | 7/1980 | | JP | 2004-297947 | 10/2004 |
| EP | 0232963 | 8/1987 | | JP | 2005-006375 | 1/2005 |
| EP | 0313392 | 4/1989 | | JP | 2005-020906 | 1/2005 |
| EP | 0627805 | 12/1994 | | JP | 2005-312150 | 11/2005 |
| EP | 1108888 | 6/2001 | | NL | 8902534 | 5/1991 |
| EP | 1167754 | 1/2002 | | RU | 2000466 | 9/1993 |
| EP | 1289097 | 3/2003 | | RU | 2229621 | 5/2004 |
| EP | 1291521 | 3/2003 | | WO | WO8402382 | 6/1984 |
| EP | 1309067 | 5/2003 | | WO | WO9105953 | 5/1991 |
| EP | 1363019 | 11/2003 | | WO | WO9212343 | 7/1992 |
| EP | 1375913 | 1/2004 | | WO | WO9730504 | 8/1997 |
| EP | 1394406 | 3/2004 | | WO | WO9733357 | 9/1997 |
| EP | 1394451 | 3/2004 | | WO | WO9840627 | 9/1998 |
| EP | 1589222 | 10/2005 | | WO | WO9930031 | 6/1999 |
| EP | 1612415 | 1/2006 | | WO | WO9933165 | 7/1999 |
| EP | 1641102 | 3/2006 | | WO | WO9937912 | 7/1999 |
| EP | 1677002 | 7/2006 | | WO | WO9939426 | 8/1999 |
| EP | 1772624 | 4/2007 | | WO | WO0001056 | 1/2000 |
| EP | 1780409 | 5/2007 | | WO | WO0106121 | 1/2001 |
| EP | 1829762 | 9/2007 | | WO | WO0106623 | 1/2001 |
| EP | 1921311 | 5/2008 | | WO | WO0107784 | 2/2001 |
| EP | 2060786 | 5/2009 | | WO | WO0121956 | 3/2001 |
| EP | 2187047 A2 * | 5/2010 | | WO | WO0125631 | 4/2001 |
| ES | 2140301 | 2/2000 | | WO | WO0129413 | 4/2001 |
| FR | 806292 | 12/1936 | | WO | WO0134973 | 5/2001 |
| FR | 859844 | 12/1940 | | WO | WO0135517 | 5/2001 |
| FR | 1348765 | 1/1964 | | WO | WO0169754 | 9/2001 |
| FR | 2401091 | 3/1979 | | WO | WO0233254 | 4/2002 |
| FR | 2445053 | 7/1980 | | WO | WO02057624 | 7/2002 |
| FR | 2519483 | 7/1983 | | WO | WO02083523 | 10/2002 |
| FR | 2594272 | 8/1987 | | WO | WO03036084 | 5/2003 |
| FR | 2760492 | 9/1998 | | WO | WO03067081 | 8/2003 |
| FR | 2796671 | 1/2001 | | WO | WO03076801 | 9/2003 |
| FR | 2798168 | 3/2001 | | WO | WO2004017497 | 2/2004 |
| FR | 2810374 | 12/2001 | | WO | WO2005103489 | 11/2005 |
| FR | 2882404 | 8/2006 | | WO | WO2006013722 | 2/2006 |
| GB | 191317268 | 0/1914 | | WO | WO2006032515 | 3/2006 |
| GB | 859176 | 1/1961 | | WO | WO2007063370 | 6/2007 |
| GB | 1524477 | 9/1978 | | WO | WO2007110718 | 10/2007 |
| GB | 1537729 | 1/1979 | | WO | WO2008052562 | 5/2008 |
| GB | 2041111 | 9/1980 | | WO | WO2008078342 | 7/2008 |
| GB | 2050525 | 1/1981 | | WO | WO2008086608 | 7/2008 |
| GB | 2075274 | 11/1981 | | WO | WO2008098573 | 8/2008 |
| GB | 2131630 | 6/1984 | | WO | WO2008102184 | 8/2008 |
| GB | 2144587 | 3/1985 | | WO | WO2008116463 | 10/2008 |
| GB | 2208243 | 3/1989 | | WO | WO2008131766 | 11/2008 |
| GB | 2266937 | 11/1993 | | | | |
| GB | 2372783 | 9/2002 | | | | |
| JP | 57059462 | 4/1982 | | | | |
| JP | 3145945 | 6/1991 | | | | |
| JP | 5122912 | 5/1993 | | | | |
| JP | 6002970 | 1/1994 | | | | |

OTHER PUBLICATIONS

Variable Speed Gearless Wind Turbine (website), http://www.mhi.cojp/msmw/mw/en/gearless.html, viewed on Sep. 22, 2006.

* cited by examiner

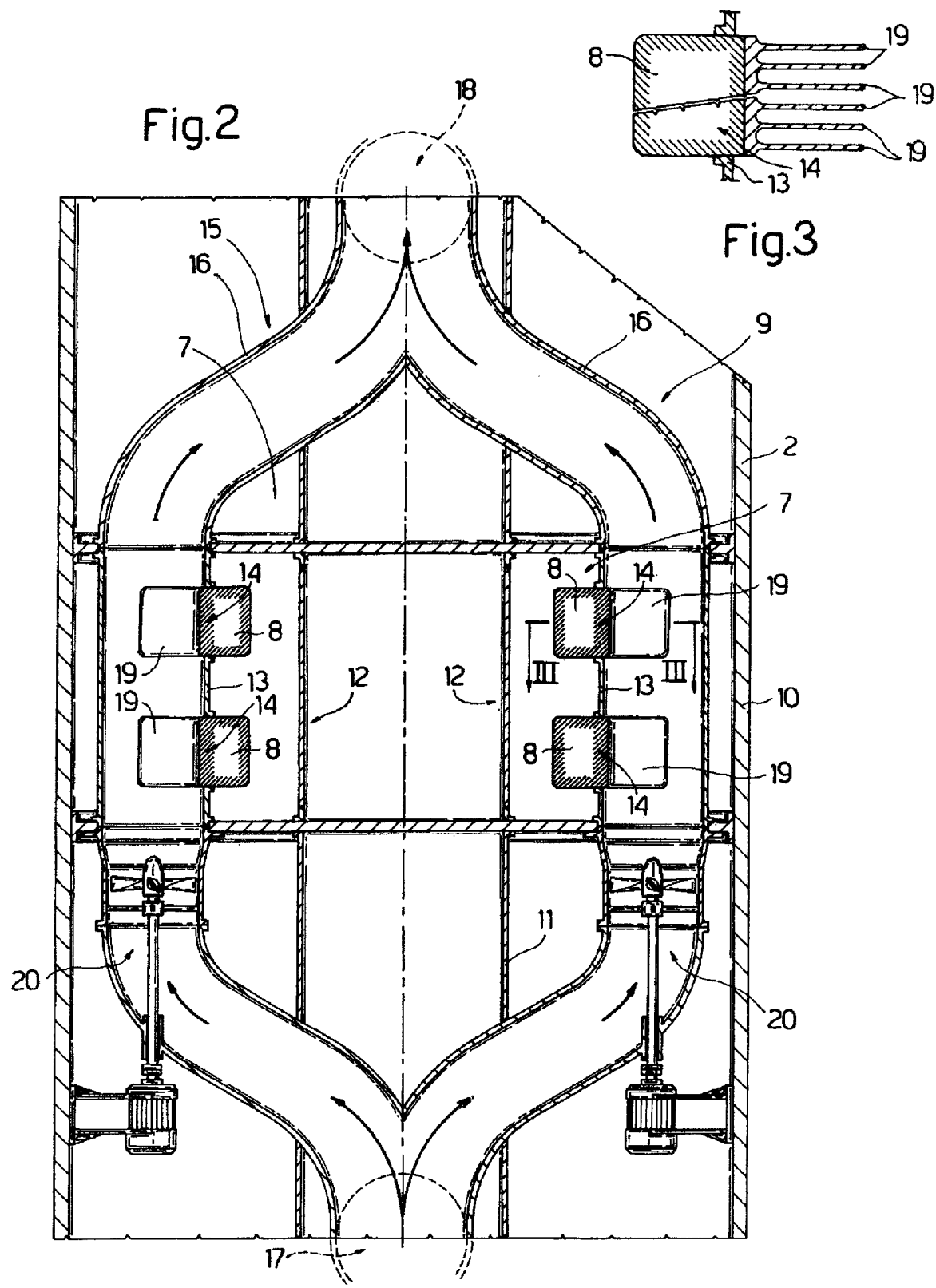

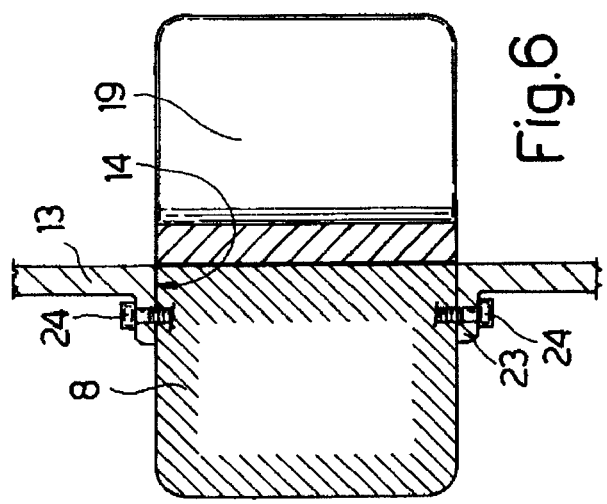
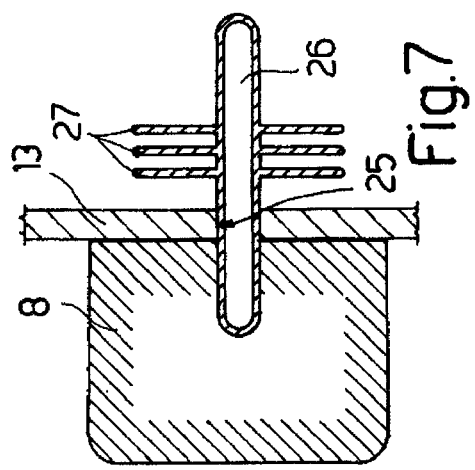
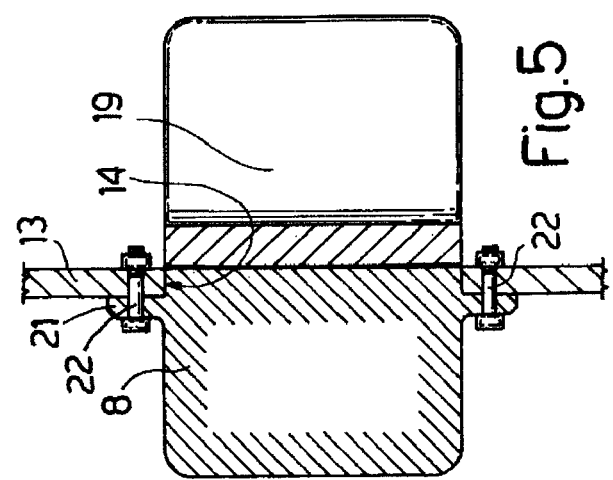
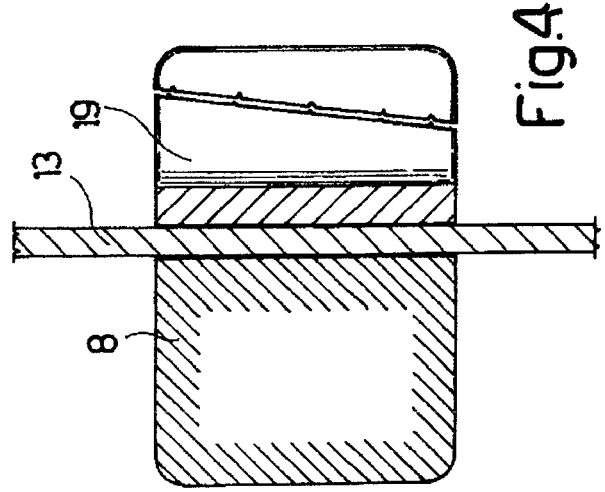

WIND POWER TURBINE WITH A COOLING SYSTEM

PRIORITY CLAIM

This application claims the benefit of and priority to Italian Patent Application No. MI2008A 002006, filed on Nov. 12, 2008, the entire contents of which are incorporated herein.

TECHNICAL FIELD

The present disclosure relates to a wind power turbine equipped with a cooling system.

More specifically, one embodiment of the present disclosure relates to a wind power turbine comprising a pylon; a nacelle; an electric generator fitted to the nacelle to produce electric energy; a frequency converter inside the pylon; and a cooling system for cooling the frequency converter.

BACKGROUND

Many of the component parts, such as the electric generator, frequency converter, etc., of a wind power turbine for producing electric energy generate heat that must somehow be dissipated.

In some wind turbines, certain components are cooled by a coolant circuit, as described, for example, in U.S. Pat. No. 6,520,737.

Fluid cooling, however, calls for careful maintenance of the circuit and provision of a coolant tank.

Alternatively, as described, for example, in EP Patent Application No. 1,200,733 or in PCT Patent Application No. WO 01/06121 A1, cooling is performed by a closed-loop circuit formed partly by the pylon itself, and in which an air stream is conveyed.

Alternatively, as described in PCT Patent Application No. WO 2007/110719, heat-producing component parts are cooled by fixing them directly to the wall of the pylon, relying on wind action on the pylon to cool them sufficiently.

PCT Patent Application No. WO 99/30031 discloses a cooling system for wind power turbine wherein the pylon itself defines the conduit and the chimney effect of the same is used to convey an air stream from the base to the top of the pylon and to cool those heat producing devices housed inside the pylon.

In the latter solutions, the pylon and more specifically, the outer wall of the pylon is the main heat exchange element. Even in exceptionally windy locations, however, wind action on the pylon is not always sufficient to adequately cool, directly or indirectly, component parts subject to overheating. That is, in weather conditions characterized by strong sunlight heating the pylon wall, and by relatively mild wind, the pylon fails to ensure adequate cooling of the converter.

In accordance to the arrangement disclosed in PCT Patent Application No. WO 2007/110719 and PCT Patent Application No. WO 99/30031, humid and dirty air is permitted to enter into the inner compartment where sophisticated electronic components are housed.

German Patent Application No. DE 199 47 915 A1 discloses a wind power turbine comprising a pylon having a first outer wall; a nacelle having a second outer wall; an electric generator fitted to the nacelle to produce electric energy; a heat generating apparatus housed in an apparatus space arranged at the base of the pylon; and a cooling system for cooling the heat generating apparatus. The cooling system is of the open-loop circuit type and includes a conduit, which is housed inside the pylon and the nacelle and connects an inlet port, formed in the apparatus space, to an outlet port formed in the nacelle.

The cooling conduit extends across the heat generating device and therefore introduces humid and dirty air into the heat generating device. Since the heat generating devices are often electronic power devices, such a cooling system may cause severe drawbacks to the operativeness of the wind power turbine.

Thus, it should be appreciated from the above that, in general, known cooling techniques are invariably far from satisfactory.

SUMMARY

In various embodiments, the present disclosure provides a wind power turbine featuring a cooling system designed to ensure highly effective cooling in any operating and weather condition.

Another embodiment of the present disclosure provides a wind power turbine featuring a straightforward, low-cost cooling system configured to keep the inside of the pylon, and in particular the frequency converter, free of dirt and humidity.

According to one embodiment of the present disclosure, there is provided a wind power turbine comprising a pylon having a first outer wall; a nacelle having a second outer wall; an electric generator fitted to the nacelle to produce electric energy; a frequency converter housed in an inner compartment of the wind power turbine; and a cooling system for cooling the frequency converter. The cooling system comprises:
(a) an open-loop circuit including at least one conduit housed inside said inner compartment and having no outlets into the inner compartment, and connecting an inlet port, formed in the first or second outer wall, to an outlet port formed in the first or second outer wall, and
(b) at least one cooling fin thermally connected to the frequency converter and housed inside said conduit.

According to another embodiment of the present disclosure, the cooling system is exceptionally effective and hardly affected by weather conditions, on account of airflow along the conduit flowing directly over the cooling fin. The cooling efficiency is rather high because the flow is concentrated inside the conduit without dispersion in the inner compartment. Moreover, any dirt is confined inside the cooling conduit.

In various embodiments, the frequency converter comprises at least one electronic power switch, and in particular an insulated-gate bipolar transistor, and is housed in at least an electric cabinet comprising a wall fitted on one side with the electronic power switch, and on the other side with the cooling fin.

In this way the heat transfer is assured and the efficiency of the power converter is very high. At the same time the power switch is protected from any kind of pollution.

Additional features and advantages are described in, and will be apparent from, the following Detailed Description and the figures.

BRIEF DESCRIPTION OF THE DRAWINGS

A non-limiting embodiment of the present disclosure will be described by way of example with reference to the accompanying drawing, in which:

FIG. 2 shows a larger-scale lateral section of a detail of the FIG. 1 wind power turbine;

FIG. 3 shows a larger-scale section, taken substantially along line III-III and with parts removed for clarity, of a detail in FIG. 2; and FIGS. 4, 5, 6 and 7 show sections of respective variations of the FIG. 3 detail.

DETAILED DESCRIPTION

Figure 1:
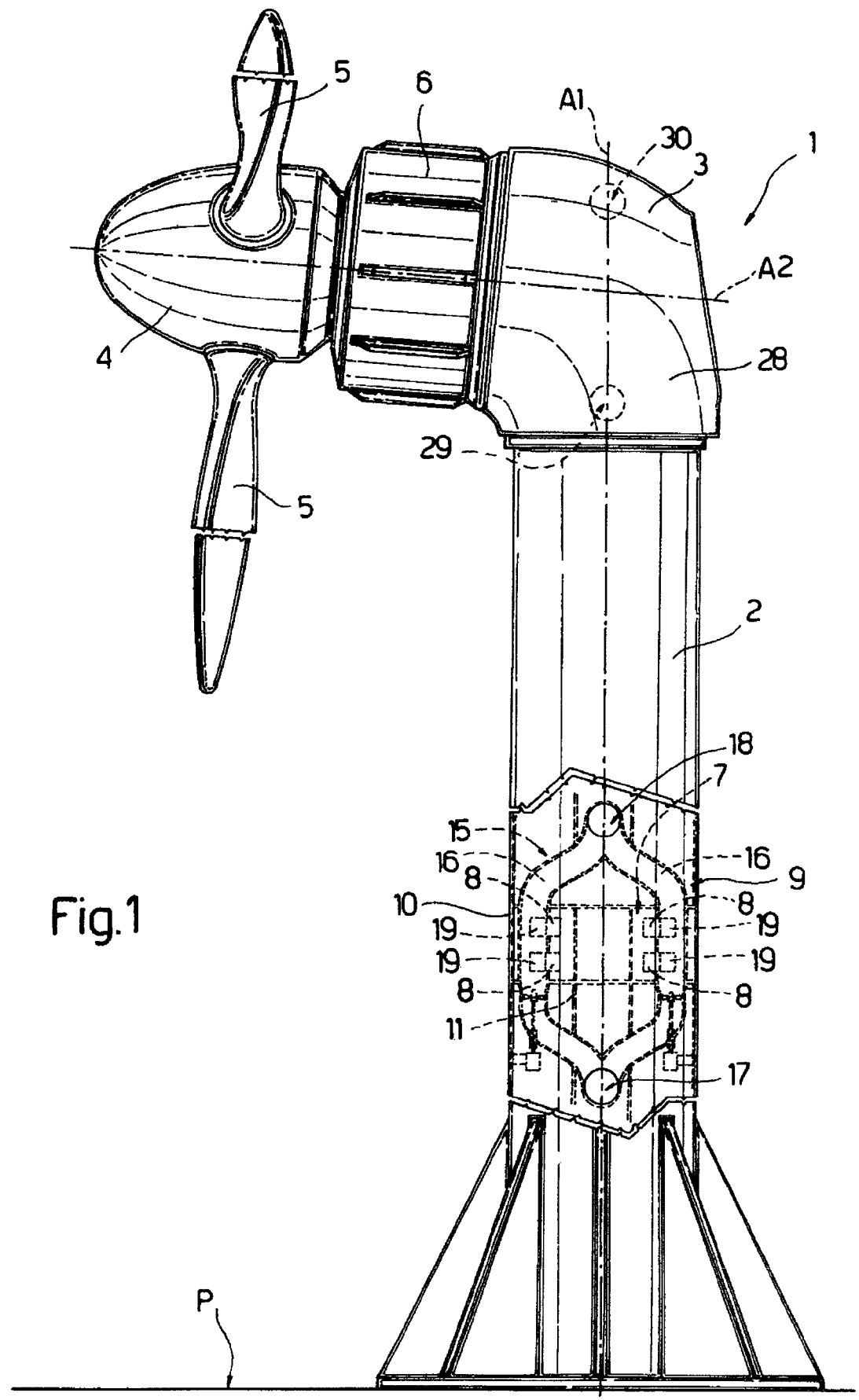
FIG. 1 shows a partly sectioned perspective side view, with parts removed for clarity, of a wind power turbine in accordance with one embodiment of the present disclosure.

Referring now to the example embodiments of the present disclosure illustrated in FIGS. 1 to 7, number 1 in FIG. 1 indicates as a whole a wind power turbine comprising a pylon 2 extending along a vertical axis A1; a nacelle 3 fitted to the top end of pylon 2 and rotating with respect to pylon 2 about axis A1; a hub 4 mounted to rotate with respect to nacelle 3 about an axis of rotation A2 crosswise to axis A1; and three blades 5, only two of which are shown in FIG. 1.

Pylon 2 is substantially defined by a hollow cylinder housing stairs and/or elevators (not shown in the drawings).

Pylon 2 is normally anchored to the ground by a foundation (not shown in the drawings), and projects vertically from a supporting surface P.

Wind power turbine 1 comprises a synchronous electric generator 6 fitted to nacelle 3; and a frequency converter 7, which, in the example shown, is housed inside pylon 2 and comprises electronic power switches 8, in particular, insulated-gate bipolar transistors, commonly known as IGBTs.

Frequency converter 7 provides for converting variable-frequency electric energy to constant-frequency, in particular mains frequency, energy.

Nacelle 3 comprises a hollow body fitted to the top end of pylon 2 to rotate about axis A1, and supports electric generator 6.

Wind power turbine 1 comprises a cooling system 9 housed inside pylon 2 at, and for cooling, frequency converter 7.

Pylon 2 and nacelle 3, in fact, define an inner compartment, in which, more generally speaking, frequency converter 7 may be housed at either pylon 2 or nacelle 3.

With reference to FIG. 2, pylon 2 comprises an outer wall 10; and a structure 11 housed inwards of and spaced apart from wall 10. Structure 11 supports two electric cabinets 12, which house frequency converter 7 and are raised off supporting surface P (FIG. 1), and each electric cabinet 12 is separated from wall 10 of pylon 2 by a gap.

In the FIG. 2 example, each electric cabinet 12 comprises a wall 13 fitted with electronic power switches 8; wall 13 has openings 14, each housing a respective electronic power switch 8; and, as shown more clearly in FIG. 3, opening 14 is the same size as electronic power switch 8, which fits snugly inside respective opening 14.

With reference to FIG. 2, cooling system 9 comprises an open-loop circuit 15 for drawing in air from outside wind power turbine 1; feeding the air along a given path, extending along the inner compartment of wind power turbine 1, to cool frequency converter 7; and expelling the air from wind power turbine 1. Circuit 15 comprises two conduits 16 connecting an inlet port 17 and an outlet port 18, both formed in wall 10; and a number of cooling fins 19 housed inside conduits 16, directly contacting electronic power switches 8. Inlet port 17 is located below frequency converter 7 and electric cabinets 12, and outlet port 18 is located above frequency converter 7 and electric cabinets 12.

Each conduit 16 extends inside the inner compartment, but has no outlets or openings into the inner compartment, and prevents the cooling air from circulating freely inside the inner compartment. Each conduit 16, in fact, serves to guide the airflow over cooling fins 19.

In the example shown, each conduit 16 is tubular, and, at frequency converter 7, is defined partly by wall 13 of a respective electric cabinet 12.

Cooling system 9 also comprises a number of powered fans 20, each housed at least partly inside a respective conduit 16 to feed air from inlet port 17 to outlet port 18 in the direction indicated by the arrows in FIG. 2, and over cooling fins 19. The fans are preferably variable-speed, so as to adjust airflow also as a function of air temperature.

In the FIG. 4 variation, wall 13 has no openings, and each electronic power switch 8 and corresponding cooling fin 19 are fixed (such as being glued), in line with each other to opposite faces of wall 13. Accordingly, wall 13 is made of good heat-conducting material to transfer heat from electronic power switch 8 to cooling fin 19.

In the FIG. 5 variation, wall 13 has an opening 14 at each electronic power switch 8, which comprises a flange 21 fixed to wall 13 by fasteners, such as screws 22; and cooling fin 19 is fixed (such as being glued), directly to electronic power switch 8.

In the FIG. 6 variation, wall 13 has an opening 14 at each electronic power switch 8, and comprises a tubular flange 23 fixed to electronic power switch 8 by fasteners, such as screws 24; and cooling fin 19 is fixed (such as being glued), directly to electronic power switch 8.

In the FIG. 7 variation, wall 13 has a hole 25, and electronic power switch 8 is fitted to a heat pipe 26 extending through hole 25 and fitted to a group of cooling fins 27 on the other side of wall 13.

With reference to FIG. 1, as stated, in an alternative embodiment of the present disclosure, frequency converter 7 and respective cooling system 9 are housed inside the inner compartment at nacelle 3, which has an outer wall 28, in which an inlet port 29 and an outlet port 30 (shown by the dash lines) are formed.

In this embodiment, frequency converter 7 and respective cooling system 9 are identical to those housed inside pylon 2, except possibly for dimensional variations.

The present disclosure also includes other variations, not shown, such as each conduit comprising a respective inlet port and a respective outlet port.

Cooling system 9 according to one embodiment of the present disclosure provides for highly effective cooling of electronic power switches 8, regardless of weather conditions, as well as for keeping the inner compartment free of dirt.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A wind power turbine comprising:
   a pylon having a first outer wall;
   a nacelle having a second outer wall;
   an electric generator fitted to the nacelle and configured to produce electric energy;
   a frequency converter including at least one electronic power switch, said frequency converter housed inside at least one electric cabinet in an inner compartment of the wind power turbine, said at least one electric cabinet including a wall fitted, on one side, with said at least one electronic power switch; and a cooling system configured to cool the frequency converter, said cooling system including:

an open-loop circuit including at least one conduit housed inside said inner compartment and having no outlets into said inner compartment, said at least one conduit connecting an inlet port, formed in the first or second outer wall, to an outlet port formed in the first or second outer wall; and at least one cooling fin thermally connected to the frequency converter and housed inside said conduit, wherein the wall of the at least one electric cabinet is fitted, on another side, with said at least one cooling fin.

2. The wind power turbine of claim 1, wherein the at least one electronic power switch is an insulated-gate bipolar transistor.

3. The wind power turbine of claim 1, wherein the pylon projects vertically from a supporting surface and said at least one electric cabinet is arranged in the pylon in a raised position with respect to the supporting surface.

4. The wind power turbine of claim 1, wherein the conduit is formed partly by said wall of the at least one electric cabinet.

5. The wind power turbine of claim 1, wherein said at least one cooling fin contacts the at least one electronic power switch directly through an opening in said wall of the at least one electric cabinet.

6. The wind power turbine of claim 1, wherein said at least one cooling fin is connected thermally to the at least one electronic power switch by said wall of the at least one electric cabinet.

7. The wind power turbine of claim 1, wherein said at least one cooling fin is connected thermally to the at least one electronic power switch by a heat pipe fitted through a hole in said wall.

8. The wind power turbine of claim 1, wherein the cooling system includes a fan housed at least partly in the conduit.

9. The wind power turbine of claim 8, wherein the fan is a variable-speed fan configured to adjust airflow.

10. The wind power turbine of claim 9, wherein the fan is configured to adjust airflow as a function of air temperature.

11. The wind power turbine of claim 1, wherein said frequency converter is spaced apart from the first or second outer wall.

12. The wind power turbine of claim 1, wherein said at least one conduit connects the frequency converter to the first or second outer wall.

13. A wind, power turbine frequency converter cooling system comprising:

an open-loop circuit including at least one conduit configured to be housed inside an inner compartment of a wind power turbine and having no outlets into said inner compartment, said at least one conduit configured to connect an inlet port, formed in a first outer wall of a pylon of the wind power turbine or a second outer wall of a nacelle of the wind power turbine, to an outlet port formed in the first or second outer wall; and at least one cooling fin thermally connected to a frequency converter including at least one electronic power switch, said at least one cooling fin configured to be housed inside said conduit and said frequency converter configured to be housed inside at least one electric cabinet in the inner compartment, said at least one electric cabinet including a wall fitted, on one side, with said at least one electronic power switch and on another side, with said at least one cooling fin.

* * * * *